United States Patent
Chatzikonstantinou (10) Patent No.: US 11,391,612 B2
(45) Date of Patent: Jul. 19, 2022

(54) CORIOLIS MASS FLOW METER

(71) Applicant: HEINRICHS MESSTECHNIK GMBH, Cologne (DE)

(72) Inventor: Thomas Chatzikonstantinou, Aachen (DE)

(73) Assignee: HEINRICHS MESSTECHNIK GMBH, Cologne (DE)

( * ) Notice: Subject to any disclaimer, the term of this patent is extended or adjusted under 35 U.S.C. 154(b) by 1 day.

(21) Appl. No.: 16/761,398

(22) PCT Filed: Nov. 26, 2018

(86) PCT No.: PCT/EP2018/082571
§ 371 (c)(1),
(2) Date: May 4, 2020

(87) PCT Pub. No.: WO2019/110353
PCT Pub. Date: Jun. 13, 2019

(65) Prior Publication Data
US 2021/0072062 A1     Mar. 11, 2021

(30) Foreign Application Priority Data
Dec. 7, 2017   (EP) .................................... 17205791

(51) Int. Cl.
*G01F 1/84*      (2006.01)

(52) U.S. Cl.
CPC .......... *G01F 1/8477* (2013.01); *G01F 1/8422* (2013.01); *G01F 1/8427* (2013.01); *G01F 1/8431* (2013.01)

(58) Field of Classification Search
CPC .... G01F 1/8413; G01F 1/8422; G01F 1/8427; G01F 1/8431; G01F 1/8468; G01F 1/8472; G01F 1/8477
See application file for complete search history.

(56) References Cited

U.S. PATENT DOCUMENTS

| | | | | |
|---|---|---|---|---|
| 4,895,031 A | * | 1/1990 | Cage | G01F 1/8409 73/861.355 |
| 5,301,557 A | * | 4/1994 | Cage | G01F 1/8409 73/861.355 |

(Continued)

FOREIGN PATENT DOCUMENTS

| CN | 102037336 A | 4/2011 |
|---|---|---|
| EP | 1429119 | 6/2004 |

(Continued)

OTHER PUBLICATIONS

International Search Report and Written Opinion of the Searching Authority, International Application No. PCT/EP2018/082571, dated Feb. 22, 2019.

(Continued)

*Primary Examiner* — Erika J. Villaluna
(74) *Attorney, Agent, or Firm* — The Roy Gross Law Firm, LLC; Roy Gross (57) ABSTRACT

A coriolis mass flow meter, including: a housing body, having a flow inlet and flow outlet for a fluid medium, two measurement tubes, which are spaced apart from each other fastened to the housing body connecting the flow inlet and the flow outlet to each other, at least one electrically controllable vibration exciter for each measurement tube (23, 24), the vibration exciter being designed to cause the measurement tube to vibrate, and at least two electrically controllable vibration sensors, the vibration sensors being designed to sense the vibration of at least one of the two measurement tubes. The vibration exciter vibration sensors are spatially fixedly fastened to the housing body between the two measurement tubes and are designed as electromagnetic coils. Each coil interacts with a permanent magnet fastened to one of the measurement tubes. The permanent (Continued)

magnets are oriented in such a way that permanent magnets attract each other.

14 Claims, 7 Drawing Sheets

(56) References Cited

U.S. PATENT DOCUMENTS

| | | |
|---|---|---|
| 5,349,872 A | 9/1994 | Kalotay et al. |
| D418,767 S | 1/2000 | Oakley |
| D419,088 S | 1/2000 | Oakley |
| D423,388 S | 4/2000 | Oakley |
| D427,096 S | 6/2000 | McCarthy et al. |
| 6,776,052 B2 | 8/2004 | Crisfield et al. |
| 6,802,224 B2 | 10/2004 | Nakao et al. |
| 7,971,494 B2 | 7/2011 | Hussain et al. |
| D668,979 S | 10/2012 | Robb et al. |
| D674,302 S | 1/2013 | Robb et al. |
| D741,737 S | 10/2015 | Feng et al. |
| D744,362 S | 12/2015 | Feng et al. |
| 10,024,702 B2 | 7/2018 | Feng et al. |
| 2010/0005906 A1 | 1/2010 | Shimizu et al. |
| 2011/0041623 A1 | 2/2011 | Lanham et al. |
| 2012/0271268 A1 | 10/2012 | Suzuki et al. |
| 2017/0102257 A1 | 4/2017 | Murakami et al. |

FOREIGN PATENT DOCUMENTS

| | | |
|---|---|---|
| EP | 3153827 | 4/2017 |
| JP | 58123429 | 7/1983 |
| JP | 2008209223 A | 9/2008 |

OTHER PUBLICATIONS

Extended European Search Report, European Application No. 17205791, dated May 8, 2018.
Office Action for Chinese Patent Application No. 201880073584.1 dated Sep. 3, 2021 5 pages.

* cited by examiner

CORIOLIS MASS FLOW METER

CROSS REFERENCE TO RELATED APPLICATIONS

This application is a National Phase of PCT Patent Application No. PCT/EP/2018/082571 having International filing date of Nov. 26, 2018, which claims the benefit of priority of European Application No. 17205791.1 filed on Dec. 7, 2017 entitled CORIOLIS MASS FLOW METER. The contents of the above applications are all incorporated by reference as if fully set forth herein in their entirety.

BACKGROUND

The invention relates to a Coriolis mass flow meter according to the preamble of claim 1 having a housing body, which has a flow inlet and a flow outlet for a fluid medium, and two measurement tubes, which are spaced apart from each other, preferably in parallel, and are fastened to the housing body and connect the flow inlet and the flow outlet to each other, so that a fluid medium to be measured flows from the flow inlet through the measurement tube to the flow outlet, i.e. in other words, the measurement tubes connect the flow inlet and the flow outlet to each other in terms of flow. At least one electrically controllable vibration exciter is provided for each measurement tube, the vibration exciter being designed to cause the measurement tube to vibrate. Furthermore, the Coriolis mass flow meter has at least two electrically controllable vibration sensors, the vibration sensors being designed to sense the vibration of at least one of the two measurement tubes. When the flow of the fluid medium is being measured, the two measurement tubes vibrate against each other.

BRIEF DESCRIPTION OF RELATED DEVELOPMENTS

The principle of Coriolis mass flow meters is known from the prior art and is described, for example, in U.S. Pat. No. 6,776,052 B2 or EP 1429 119 A1. The principle of the known Coriolis mass flow meters is described below with reference to FIG. 1, which shows a Coriolis mass flow meter 100' according to the prior art in perspective. To allow a view inside, parts of the housing and process connections are not shown. The connection cable and any evaluation electronics are also not shown in FIG. 1. The connection cables usually run freely between the electronic components and a device plug for connecting an external measurement and evaluation electronics system or to a measurement and evaluation electronics system arranged outside the measurement space. Coriolis mass flow meter 100' according to the prior art have two measurement tubes 1', 2' and a vibration exciter which is constructed from a permanent magnet coil pair 9',10' in order to transmit vibrations to the measurement tubes 1', 2'. Furthermore, two vibration sensors are provided, each of which is also constructed from a permanent magnet coil pair 11', 13' or 12', 14' for sensing the vibrations of the measurement tubes 1', 2'. The permanent magnet coil pairs 9' and 10', 11' and 13', 12' and 14' are each arranged on the measurement tubes 1', 2' in such a way that the permanent magnets 9', 11', 12' are fastened to the measurement tube 1' and the coils 10', 13' and 14' are fastened to the measurement tube 2' by suitable holders. When a current pulse flows through the coil 10' of the vibration exciter on the measurement tube 2', the permanent magnet 9' (depending on the polarity) fastened to the other measurement tube 1' is drawn into the coil 10' or repelled by the coil 10'. This causes the two measurement tubes 1' and 2' to vibrate against each other.

Figure 1:
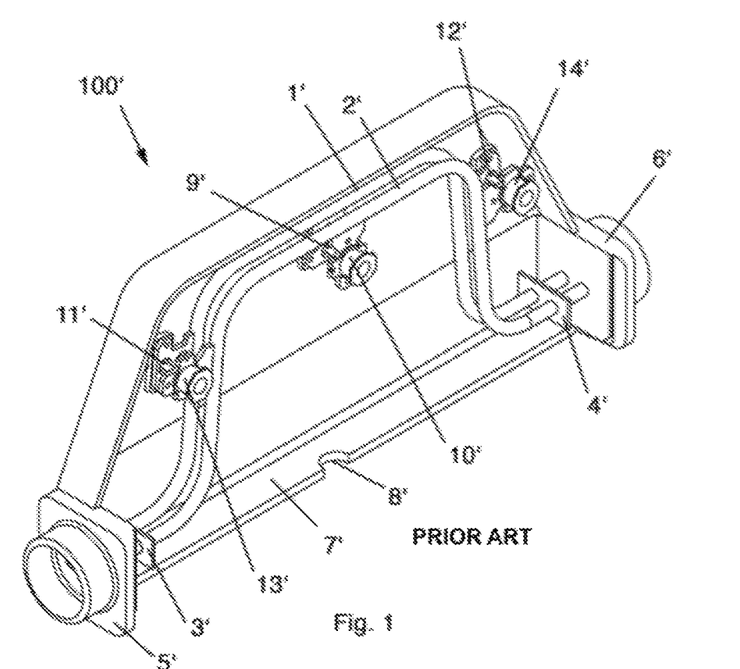
FIG. 1 shows in perspective a Coriolis mass flow meter according to the prior art.

To fix the measurement tubes 1', 2', at least two coupling elements 3', 4', sometimes also referred to as cross struts or gusset plates, are provided for coupling the measurement tubes in order to keep the vibration conditions for both measurement tubes 1' and 2' comparable and to isolate them from the rest of the device in terms of vibration. The inlet and outlet sides of the two measurement tubes 1', 2' are connected in pairs to a respective flow divider 5', 6', of which the flow divider 5' on the inlet side supplies the flowing fluid to the inlets of the two measurement tubes 1', 2' and the flow divider 6' on the outlet side discharges the flowing fluid from the outlets of the two measurement tubes. The flow dividers 5', 6' are received on the inlet and outlet sides by a housing 7' (which is only partially shown and is hollow inside), so that the measurement tubes 1', 2', the vibration exciter 9',10', the vibration sensors 11', 13' and 12', 14' and the coupling elements 3', 4' are protected in the interior of the housing 7. The housing 7 is also constructed in such a way that the passage 8' of cables from the inside of the device to the outside, i.e. for measurement and evaluation electronics, is possible.

In order to be able to be installed in a process line, Coriolis mass flow meters also comprise process connections (not shown in FIG. 1) which, depending on the housing variant, are either connected on the inlet and outlet sides to the housing 7' or directly to the flow dividers 5', 6'.

In Coriolis mass flow meters according to the prior art, vibration exciters are usually constructed in such a way that they have, for example, a permanent magnet 9' on one of the measurement tubes 2' and a coil 10' on the opposite measurement tube 1' in order to electrically transmit vibrations to both measurement tubes 1', 2' by generating a force effect. Each of the two vibration sensors also usually has a respective permanent magnet 11', 12' on one of the measurement tubes 1' and a coil 13', 14' on the opposite measurement tube 2' in order to detect the vibrations of the measurement tubes 1', 2' by induction effect. The vibration sensors are usually installed on the inlet and outlet sides.

U.S. Pat. No. 5,349,872 describes an arrangement of excitation and measurement coils on circuit boards, each of which is arranged above and below the measurement tubes and is fastened at angles to a housing shell.

Without flow, the signals from the two vibration sensors are in phase with each other. When fluid (fluid medium) is flowing through, the different Coriolis forces on the inlet and outlet sides result in a phase shift of the signals of the two vibration sensors, which is proportional to the instantaneous mass flow of the fluid medium. The mass flow of the fluid medium can thus be determined by the phase shift of the signals.

Coriolis mass flow meters 100' according to the prior art are available for a wide variety of measurement ranges. The range extends from very large devices with a mass flow of thousands of tons per hour down to very small devices with a mass flow of one kilogram per hour and less. However, the smaller a Coriolis mass flow meter 100' according to the prior art becomes, the more design and ultimately measurement-related problems arise, because while most of the components of the device can also be made smaller when the meter 100' is made smaller (in accordance with the measurement range), such as the measurement tubes 1', 2', the magnets 9', 11', 12', the coupling elements 3', 4' etc. and even the housing 7', a scaling down to small sizes for the coils 10', 13',14' of the vibration exciters and vibration sensors and accordingly for their fastening elements on the measurement tubes 1', 2', the so-called coil holders, is no longer so easily possible. Both have various unfavourable measurement properties of these devices and lead to design difficulties in the case of small Coriolis mass flow meters according to the prior art.

Comparable Coriolis mass flow meters are known from US 2010/005906 A1 or US 2011/041623 A1, in which a carrier with the measurement electronics is arranged between the two measurement tubes. The measurement tubes themselves are connected to each other via gusset plates in order to generate defined vibrations of the measurement tubes. However, this arrangement is also not easily scalable to smaller sizes, because with smaller measurement arrangements, even minor inaccuracies in the construction, for example in the positioning of the magnets or the gusset plates, have a relatively increasing influence on the measurement accuracy.

SUMMARY

It is an object of the present invention to provide a Coriolis mass flow meter which is simpler in terms of design and more scalable to small sizes (for a correspondingly small measurement range).

This object is achieved by a Coriolis mass flow meter having the features of claim 1. In a Coriolis mass flow meter of the type mentioned at the outset, it is provided in particular that the vibration exciters and the vibration sensors are spatially fixedly fastened to the housing body, for example on an add-on structure, between the two measurement tubes. For the purposes of the Coriolis mass flow meter according to the invention described below, vibration exciters and vibration sensors are understood to mean the electrically controllable components of the vibration exciters and vibration sensors, i.e. for example electromagnetically operated coils.

By a spatially fixed fastening to the housing body it is meant that the vibration exciters and vibration sensors are not fastened to a component which is caused to vibrate relative to the housing body for carrying out the measurement, i.e. in particular not on a measurement tube, and caused to vibrate relative to the housing body. This means that vibration exciters and vibration sensors are not fastened to a component which is caused to vibrate according to the measurement principle applied and whose vibration is detected and evaluated to determine the mass flow of the medium. Possible natural vibrations of the vibration exciter, vibration sensor or add-on structure due to the design which are small (e.g. less than 10% or 20%) in comparison to the vibration of the measurement tubes required for measurement are not referred to as vibrations for the purposes of this description and are considered to be spatially fixed. Such possible vibrations are undesirable, and it is also an aspect of the invention to avoid such undesirable vibrations. The concept proposed according to the invention also contributes to the fact that the electrically controllable parts of the vibration exciters and vibration sensors are not arranged on parts that resonate as intended, i.e. in particular not on the measurement tubes.

Because the electrically controllable vibration exciters and vibration sensors are not fastened to the measurement tubes and do not resonate with them during the implementation of the measurement principle, the electrically controllable vibration exciters and vibration sensors do not influence the vibration of the measurement tubes, and thus the measurement itself.

We can think, for example, of the outer dimensions of the coils as vibration exciters and vibration sensors, which would have to be very small according to the design principle known from the prior art if they were to be fastened to correspondingly small measurement tubes. The diameter of the coil wire would then be so thin that it could hardly be wound and that sudden wire breaks on the connecting wires which connect the coil to the continued lines inside the device could or would occur. Such wire breaks are a common occurrence, even in very large devices, because in Coriolis mass flow meters according to the prior art, the connecting wires always vibrate together with the coils, more or less in an uncontrolled manner, which leads to problems even in meters with correspondingly large dimensions and is no longer manageable for small meters in a correspondingly small measurement range.

The fact that coils, coil wire and coil holder cannot be reduced to any size, however, causes further problems in small Coriolis mass flow meters according to the prior art. From a certain size, coiling and coil holding become very heavy compared to the measurement tubes themselves. As a result, i.e. due to the relatively high mass of the coils and the coil holders, the natural frequency of the measurement tubes changes significantly downwards. The devices then operate in ranges of very low frequencies, e.g. near 100 Hz or even lower, which makes the devices not only less accurate but also very sensitive to external influences such as, for example, vibrations, shock waves, etc. Furthermore, the local increase in mass due to the coils and the coil holders causes very high jumps in mass in the "measurement tube-fluid-coil-coil holder" system, so that there are various inherent dynamic modes during operation that further distort the measurement result.

A further problem also arises in small Coriolis mass flow meters according to the prior art due to the reduction in size. Dimensional deviations and tolerances in the manufacture and assembly of the ever smaller components are beginning to become even more important than in large (large-dimensioned) meters. The concatenation of dimensional deviations and tolerances is also particularly important in small meters. As a result, small devices are in most cases more difficult to manufacture and usually less accurate than larger devices.

According to the invention, these disadvantages described above are avoided by the fact that the electrically controllable parts, which due to their function cannot simply be scaled as small as desired and also require an electrical connection to the measurement and evaluation electronics, are no longer part of the vibrating system. This reduces the mechanical stresses (e.g. regarding the cable connection) and the influence on the measurement system (i.e. the vibrating measurement tubes).

The vibration exciters are preferably arranged between the measurement tubes in such a way that the vibration exciters for both measurement tubes act on the measurement tubes in opposite spatial directions when electrically controlled. This has the consequence that, with an identical and simultaneous electrical control of the vibration exciters, the measurement tubes are caused to vibrate in opposite directions, so that when fluid medium flows through, the flow of the fluid medium in the mass flow meter can be measured due to the phase shift of the signals as a result of the Coriolis effect.

According to the invention, electromagnetic coils are used as vibration exciters and vibration sensors, which, for example, can be identical in design for all vibration exciters and vibration sensors. Each electromagnetic coil interacts with a permanent magnet fastened to one of the measurement tubes to generate the vibration or to sense the vibration. When the coil acting as a vibration exciter is electrically controlled, current is applied to it, said coil generates a magnetic field and thereby moves the permanent magnet fastened to the measurement tube. A vibration of the measurement tube can thus be generated by a correspondingly adjusted application of current. Conversely, the movement of the permanent magnet in the coil caused by the vibration of the measurement tube produces a current which can be measured in the context of the electrical control of the coil acting as a vibration sensor, for example by means of a current and/or voltage measurement. The use of coils which are substantially or completely identical in design has the advantage that the generation and sensing of vibrations are easily coordinated with each other. The permanent magnets on the measurement tubes can be easily scaled according to the size and mass of the measurement arrangement, and in particular of the measurement tubes, and (unlike, for example, connecting cables used to control electrical components) are not mechanically moved relative to the measurement tubes carrying them (i.e. the permanent magnets) when the measurement tubes vibrate.

According to the invention, the measurement tubes are arranged in parallel. The permanent magnets on the measurement tubes are fastened opposite each other and oriented in such a way that the permanent magnets attract each other. When permanent magnets attract each other, the measurement tubes, which usually vibrate in opposite directions, tend to attract each other in the vibrating movement. This is a (similar to a tension rod) a stable state. This means that the measurement tubes are deflected from a stable state and tend to return to this state. In contrast, in the case of repelling permanent magnets, the measurement tubes, which usually vibrate in opposite directions, tend to repel each other in the vibrating movement. This is (similar to a pressure rod) an unstable state. This means that the measurement tubes are deflected from an unstable state and tend (due to the instability, similar to a pressure rod that can break out in any direction), to superimpose the vibration of the measurement tubes in the opposite direction (i.e. the measurement-relevant vibration) with additional deflections that randomly change in any direction (in other words: to "contaminate") and thus distort the measurement results. These harmful deflections are so small that they are generally not visible to the naked eye. However, they can influence the vibration behaviour and—especially in the case of small measurement arrangements—can lead to significant measurement inaccuracies. These do not occur in the arrangement of attracting permanent magnets according to the invention.

According to a preferred embodiment, an add-on structure (in the form of a holder) can be fastened to the housing body, which add-on structure carries the vibration exciters and vibration sensors (such that the vibration exciters and vibration sensors are fastened to the add-on structure and are arranged between the measurement tubes). The add-on structure can be formed by stable components, for example correspondingly solid and non-flexible fastening elements (such as angles, supports, guides, circuit board holders, non-flexible circuit boards) in such a way that it intercepts the counterforces arising when the vibration of the measurement tubes is generated and fixes the vibration exciters and vibration sensors in a spatially fixed manner to the housing body and dampens or absorbs their (undesired) possible natural vibration. The add-on structure is designed such that the vibration exciters and vibration sensors are arranged between the two measurement tubes in the manner described according to the invention.

In a preferred development of the invention, the add-on structure can have at least one circuit board on which the electrically controllable vibration exciters and vibration sensors are fastened and can be controlled via conductor tracks formed on the circuit board. Thus the entire control of the sensor components and, if applicable, the measurement electronics also provided there, can be carried out via the circuit board. According to the invention, there is thus no need for wire connections or other electrical connections, which are oscillated with the excited vibration of the measurement tubes, which connections are made to the vibration exciters and vibration sensors, in particular the coils, or other electrical or electronic components of the meter (measurement electronics) which are mechanically stressed by the vibrations and may break, for example. The measurement electronics on the circuit board can also be further electrical and/or electronic components, such as, for example, processors, sensors (for example a temperature sensor and/or other sensors), evaluation electronics or the like, and can be integrated into an electrical circuit without the need to for wiring in the measurement region between the measurement tubes, which may influence the measurement. This arrangement also makes it possible not to attach any electronically or electrically controllable components to the measurement tubes themselves and thus to influence their natural frequency during vibration, thereby distorting measurement results or providing appropriate corrections. The permanent magnets, or, if applicable, counterweights provided on measurement tubes instead of the permanent magnets, can have the same design at all points, so that no change in the vibration properties of one measurement tube relative to the other is produced. In addition, the permanent magnets can also be scaled with the measurement tubes in such a way that the weight of the permanent magnets does not cause any local changes in the vibrations, for example local vibrations of a higher order.

In a preferred embodiment, the circuit board can be spatially fixedly connected to the housing body via at least two fastening elements of the add-on structure (7). These fastening elements can in particular be designed as cuboid blocks, for example. One side of the block lies flat against the housing body, and another side of the block lies flat against the circuit board. As a result, the circuit board is fixed firmly in place because each fastening element has both a common contact surface with the housing body and a common contact surface with the circuit board. Each of the fastening elements (or each block) can also have a higher mass than the circuit board. This counteracts undesirable vibrations of the circuit board. The circuit board is preferably fastened to the two fastening elements, for example by clamping the circuit board between the two fastening elements.

In a further development of this inventive concept, the circuit board can be adjustably fastened to the two fastening elements. The circuit board can preferably be fixed in place by screws which are screwed from the first block on one side of the circuit board through through-openings in the circuit board to the second block on the other side of the circuit board. The through-openings can have a certain clearance for the screws passing through them, so that the circuit board can be finely adjusted relative to the fastening elements. Possibly. Where appropriate, the through-openings can even be designed as elongated holes if a correspondingly large adjustment option is necessary or desired.

According to a preferred embodiment, exactly two vibration sensors are arranged on at least one measurement tube, wherein at least one vibration exciter is provided on a measurement tube. According to a preferred simple embodiment, exactly one vibration exciter can also be provided on each measurement tube, wherein embodiments in which exactly two or more vibration sensors and/or vibration exciters are assigned to one measurement tube can also be useful.

In the case of a one-sided phase measurement (i.e. vibration sensing on only one measurement tube), the Coriolis mass flow meter can thus have a total of two vibration exciters (one per measurement tube) and two vibration sensors on one of the two measurement tubes, wherein vibration sensors for the other measurement tube may be installed, but are not or cannot be triggered. If only one one-sided phase measurement is provided on a measurement tube, counterweights can also be arranged on the other measurement tube instead of the permanent magnets, preferably with the same weight and at the same positions as the permanent magnets.

In the case of a phase measurement on both sides (i.e. vibration sensing on each measurement tube), the Coriolis mass flow meter can thus have a total of two vibration exciters (one per measurement tube) and four vibration sensors, i.e. two on each of the two measurement tubes.

According to a preferred embodiment, the vibration exciter can be arranged on the (each) measurement tube in the middle between the ends of the measurement tube, wherein the term "on the measurement tube" refers to the position, but not to the type of fastening, which according to the invention is done directly on the base body and not on the measurement tube. This also applies to the vibration sensor. The ends of the measurement tube are those points on both sides of the measurement tube at which the measurement tube is fixed to the housing body. By arranging the vibration exciter in the middle between these points, a vibration of the measurement tube that is symmetrical with respect to the dimensions of the measurement tube can be excited with the least possible force.

According to the invention, one vibration sensor can preferably be arranged on the measurement tube between one end of the measurement tube and the vibration exciter and another vibration sensor can be arranged on the same measurement tube between the other end of the measurement tube and the vibration exciter. Generally, the phase shift is greatest between two points that lie symmetrically with respect to the centre of the measurement tube, but somewhere between the inlet and the centre or the outlet and centre. A frequently preferred arrangement can be approximately in the middle between the vibration exciter and the end of the measurement tube, wherein approximately the middle can comprise, for example, an arrangement around the middle with a fluctuation range around the actual middle of approximately 25%. A preferred arrangement, for example, can lie approximately between 10% and 15% from the actual middle to the vibration exciter. However, the arrangement also depends on the type and shape of the measurement tubes and can be chosen appropriately by a person skilled in the art.

According to a preferred embodiment of the invention, the coils of the vibration exciters can be connected in parallel and the coils of the vibration sensors can be connected in series. In this circuit arrangement, the coils of the vibration sensors form a type of generator that amplifies the voltage signal, for example approximately doubles it in typical configurations. This increases the attainable sensitivity, especially in particularly small Coriolis mass flow meters.

A particularly suitable shape of the measurement tubes is curved, because the effect of the acting Coriolis force may be relatively small in comparison to other designs due to the curved guidance of the fluid medium, but said effect causes a higher natural frequency of the measurement tubes. The more precise mechanical behaviour of the measurement tubes also has metrological advantages. For example, the measurement tubes can be substantially u-shaped, wherein the outgoing legs of the "u", by means of which the measurement tube is fastened to the base body, can be shorter or longer than in the case of a standard letter "u". A u-shape with a leg that is shorter in comparison to a standard letter "u" is a preferred embodiment here.

A particularly preferred design according to the invention provides that the housing body of the Coriolis mass flow meter is designed as a solid block of material, preferably as a solid one-part block of material, in which an opening is made in each case as a flow inlet and as a flow outlet on opposite end faces, wherein in each case two flow channels lead from each opening to an exit in a side surface of the housing and wherein the exit of one of the flow channels leads into one measurement tube and the exit of the other of the flow channels leads into the other measurement tube. In such an embodiment, the flow channels form flow dividers to which the measurement tubes are connected. A solid base body according to the invention has the advantage of a high mass—compared to the measurement tubes which are caused to vibrate—so that undesired natural vibrations of the meter or its components (not the measurement tubes) are minimised as a result.

Instead of a solid housing body according to the most preferred embodiment described above, a flow divider—already known from the prior art—can also be provided according to the invention as the flow inlet and flow outlet to which the measurement tubes are fastened. A comparable vibration behaviour of the measurement tubes can also be achieved in this way.

In addition, even regardless of the provision of a flow divider, the measurement tubes (also in the case of the preferably proposed solid block of material) can be connected to each other by coupling elements, for example in the form of cross struts or gusset plates. This also promotes a comparable vibration behaviour of the measurement tubes.

An advantage of the solid block of material as the housing body preferably proposed according to the invention is, however, that all of these previously mentioned additional elements (separate flow divider, coupling elements) can be dispensed with because, in the continuation of this inventive concept, the ends of the measurement tube can be fastened directly to the solid housing body, preferably in such a way that an exit of a flow channel and an opening at the end of a measurement tube are adjacent to each other. The exits of the flow channels and the openings of the measurement tubes are preferably of the same size in order to achieve a uniform flow behaviour of the fluid medium in the transition between the flow channel and the measurement tube. A measurement tube connects the exit of a flow channel of the flow inlet and the exit of a flow channel of the flow outlet of the Coriolis mass flow meter.

A fastening of the measurement tubes which is simple in terms of design and inexpensive provides that the ends of the (each) measurement tube are welded to the housing body (or in an equivalent manner to the flow divider of the housing body if no solid housing body is provided), wherein additional material for forming the weld seam is provided on the housing body (or in an equivalent manner on the flow divider of the housing body), wherein the additional material is formed in particular by the material of the base body. In the case of a normal weld seam, welding is carried out with a wire which is applied to the weld region from the outside. In the case of a thin weld seam, this can be very complex and technically difficult. According to the invention, the additional material for forming the weld seam can be made available by virtue of the fact that a round channel (in the form of a groove) is or has been milled into the solid housing body (block of material) and forms an annular collar in the middle around the flow channel. This annular collar is then the additional material that is used instead of the welding wire in order to form the weld seam between the measurement tube and the base body formed by the solid block of material. Because the additional welding wire can thus be dispensed with according to the invention, the welding of the measurement tube to the base body is considerably simplified.

In the solid housing body a cable passage can be formed between the opening of the flow inlet and the opening of the flow outlet, which cable passage extends from the side surface with the exits of the flow channels to the opposite side surface. Through this cable passage, cables can be routed from the circuit board, on which the vibration exciters and the vibration sensors are fastened in an electrically controllable manner, to a device connection. The device connection can, for example, also be a plug connector received in the cable passage. It is also possible to use the cable routing to establish a cable connection to components of the measurement electronics, for example a control processor or control computer (inside or outside the meter).

According to a preferred embodiment, it can also be provided that components of the measurement electronics, for example a control processor, control electronics, evaluation electronics, sensors, such as, for example, temperature sensors, are arranged on the circuit board. In the art, the measurement electronics are also referred to as a measurement transducer, in the sense of measurement electronics that control, measure, convert and/or communicate. The integration of measurement electronics on the circuit board results in a particularly compact design of the Coriolis mass flow meter, in which all or part of the measurement electronics can be integrated directly into the flow meter. The cable passage and/or electrical or electronic components of the measurement electronics arranged on the circuit board itself prevent loose cable connections in the measurement space of the flow meter, which could impair the measurements or be damaged due to the vibrations excited in the measurement space.

In terms of design, the two measurement tubes can be connected to each other by means of one or more cross struts or by means of one or more gusset plates. As a result, the vibration behaviour of the two measurement tubes can be standardised, in particular in designs of the meter that are not too small. Since the gusset plates or cross struts are often soldered to the measurement tubes, it has been shown in small-scale (and thus low mass) measurement tubes that different amounts of solder on each of the measurement tubes can influence the vibration behaviour differently. In order to avoid this, it can also be provided according to the invention that the Coriolis mass flow meter does not have any cross struts and/or gusset plates. In this case, it is particularly advantageous if the housing body is designed according to the invention as a solid block of material and the ends of the measurement tubes are fastened directly to the housing body.

The Coriolis mass flow meter can be constructed in two parts from the housing body with the components fastened thereto and a housing cover (30). The installation of the meter is simple due to the small number of individual components. Because the components are firmly connected to the base body during manufacture, there are no uncontrolled vibrations, as can occur, for example, when several components have to be joined together during commissioning.

BRIEF DESCRIPTION OF THE DRAWINGS

Further features, advantages and possible applications of the invention also follow from the exemplary embodiment of the invention described below with reference to the drawing. All of the features described or pictorially represented, individually or in any combination, form the subject matter of the present invention, regardless of how they are summarised in the claims or their references.

DETAILED DESCRIPTION

Figure 2:
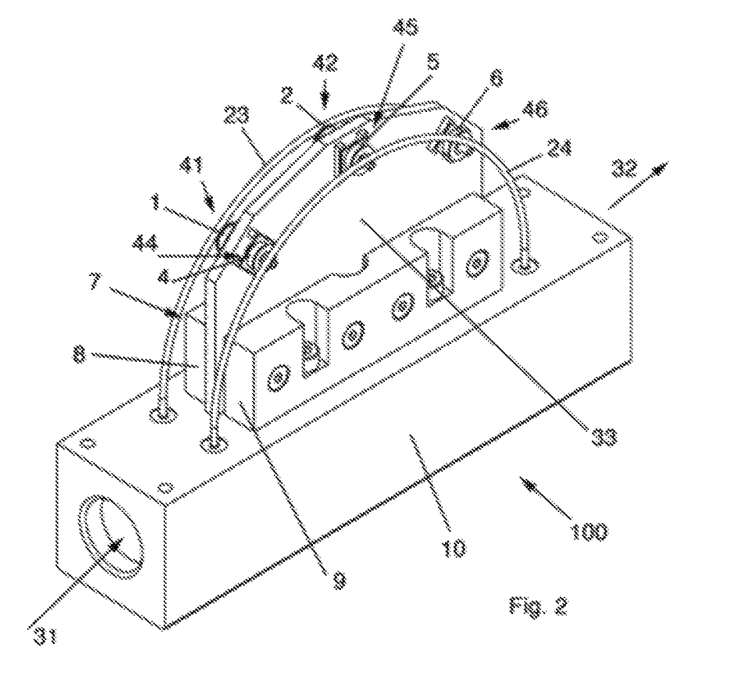
FIG. 2 shows in perspective a Coriolis mass flow meter according to an embodiment of the invention.
Figure 9:
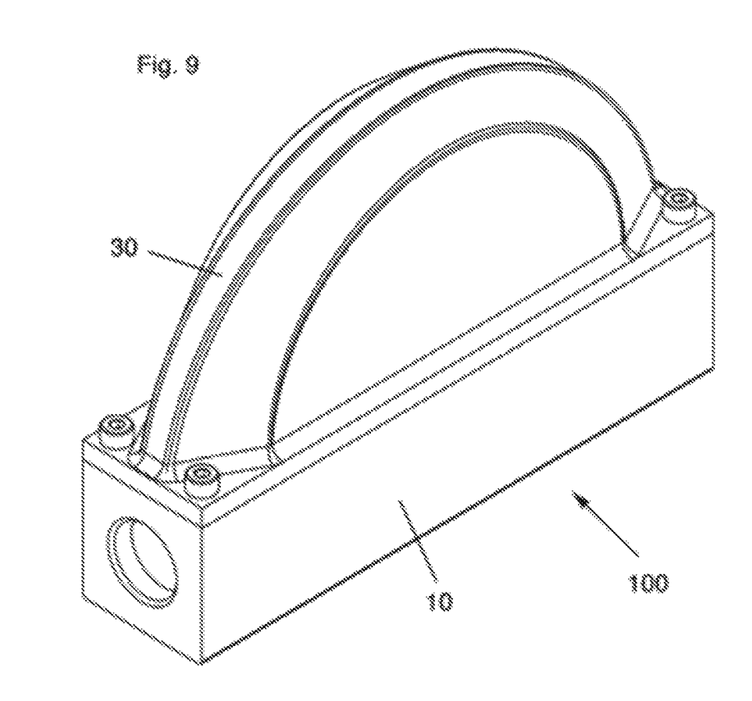
FIG. 9 shows in perspective the Coriolis mass flow meter according to FIG. 2 with mounted housing cover.

FIG. 2 shows in perspective a Coriolis mass flow meter 100 according to a preferred embodiment of the present invention without the housing cover 30 (shown in FIG. 9). On a housing body 10, which has a flow inlet 31 and a flow outlet 32 for a fluid medium, two measurement tubes 23, 24 are spaced apart from each other and in parallel and are fastened to the housing body 10 and connect the flow inlet 31 and the flow outlet 32 to each other.

An electromagnetic coil 2 is provided for the first measurement tube 23 as an electrically controllable vibration exciter 42, and an electromagnetic coil 5 is provided for the second measurement tube 24 as an electrically controllable vibration exciter 45. Each of the vibration exciters 42,45 is designed to cause the measurement tube 23, 24 in front of which it is arranged to vibrate.

Furthermore, in the exemplary embodiment shown, two electrically controllable vibration sensors 41, 43 (visible in FIG. 3, hidden in FIG. 2), 44, 46 are provided for each measurement tube 23, 24, the vibration sensors 41, 43, 44, 46 being designed to sense the vibration of at least one of the two measurement tubes 23, 24. The vibration sensors 41, 43, 44, 46 are each designed as electromagnetic coils 1, 3 (visible in FIG. 3, hidden in FIG. 2), 4, 6.

As can be seen immediately, the coils 1, 2, 3, 4, 5, 6 are not fastened to the measurement tubes 23, 24 themselves, but to an add-on structure 7, which is arranged between the two measurement tubes 23, 24, and firmly connected via fastening elements 8, 9 of the add-on structure 7 to a part of the housing, i.e. spatially fixedly connected to the housing body 10. In the embodiment shown, the add-on structure 7 comprises a circuit board 33 with electrical lines (not shown) printed thereon, which lines are connected or can be connected to the coils 1, 2, 3, 4, 5, 6 (i.e. in other words to the vibration exciters 42, 44 and vibration sensors 41, 43, 44, 46; these terms are used synonymously with coil in the context of the description of the embodiments) and, for example, to continuing lines (likewise not shown) inside the meter 100 or external connections.

In this embodiment, the coils 1, 2, 3, 4, 5, 6 are soldered to the circuit board 33. However, the invention also includes other designs in which the coils 1, 2, 3, 4, 5, 6 are screwed, glued, or fastened using other connection techniques onto the circuit board 33 or other elements of the add-on structures 7.

Figure 3:
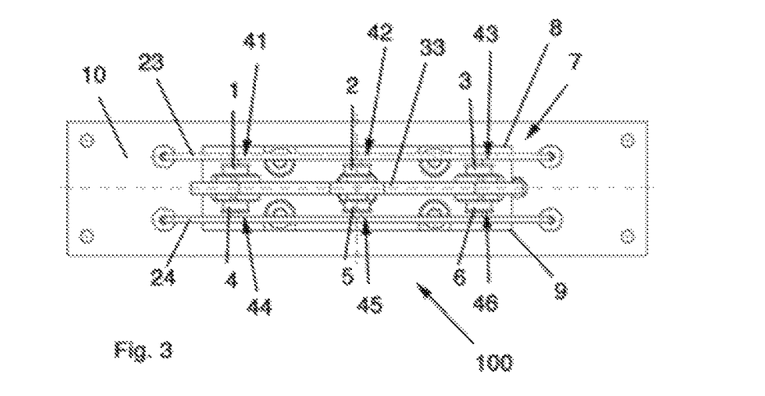
FIG. 3 shows a top view of the Coriolis mass flow meter according to FIG. 2.

FIG. 3 shows the Coriolis mass flow meter 100 from above, so that the vibration sensor 43 (coil 3) is also visible.

Figure 4:
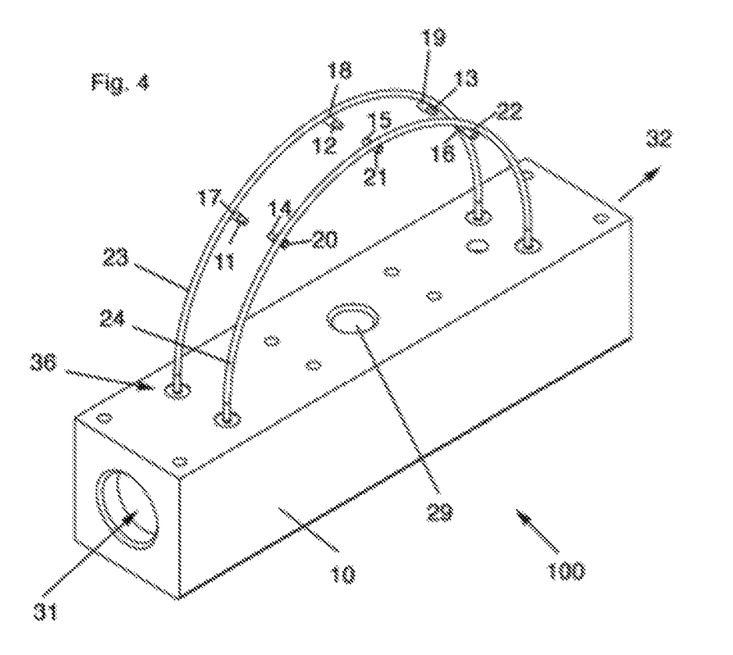
FIG. 4 shows in perspective the Coriolis mass flow meter according to FIG. 2 without vibration exciter, vibration sensor and add-on structure.

FIG. 4 shows the same Coriolis mass flow meter 100 without the add-on structure 7 having the circuit board 7 and the fastening elements 8, 9, so as to improve the visibility of permanent magnets 11, 12, 13, 14, 15, 16 and the magnet holders 17, 18, 19, 20, 21, 22, which are fastened to the measurement tubes 23, 24 in accordance with the position of the coils 1, 2, 3, 4, 5, 6 in order to interact magnetically with the coils 1, 2, 3, 4, 5, 6 when the coils 2, 5 are controlled with current (current is applied thereto) (vibration exciters 42, 45) or voltage induced by a movement of the permanent magnets 11, 13, 14, 16 or an induced current is measured in the coils 1, 3, 4, 6 (vibration sensor 41, 43, 44, 46).

The measurement tubes 23, 24 are two short U-tubes (U-shaped tubes) in this embodiment. Coupling elements for coupling the loops are not used in this design. However, the invention also includes other designs which are designed with measurement tubes 23, 24 of a different shape and/or in which the measurement tubes 23, 24 are coupled or connected to each other using coupling elements (similar to the illustration in FIG. 1 relating to the prior art).

Figure 5:
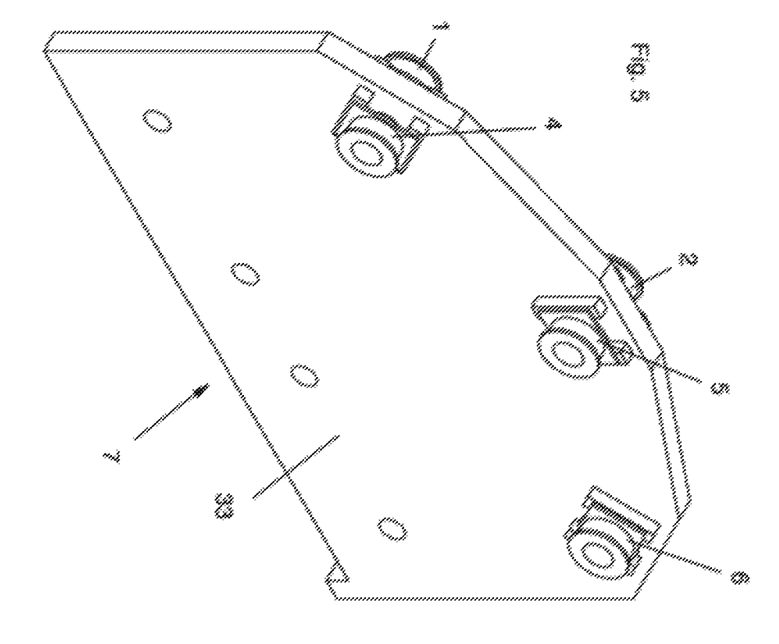
FIG. 5 shows in perspective the vibration exciters, vibration sensors and parts of the add-on structure of the Coriolis mass flow meter according to FIG. 2.

FIG. 5 shows for the sake of clarity only the circuit board 33 of the add-on structure 7 with the non-movable, i.e. spatially fixed, coils 1, 2, 3, 4, 5, 6 fastened thereon, the coil 3 not being visible and the conductor tracks on the circuit board 33 not being shown.

Figure 6:
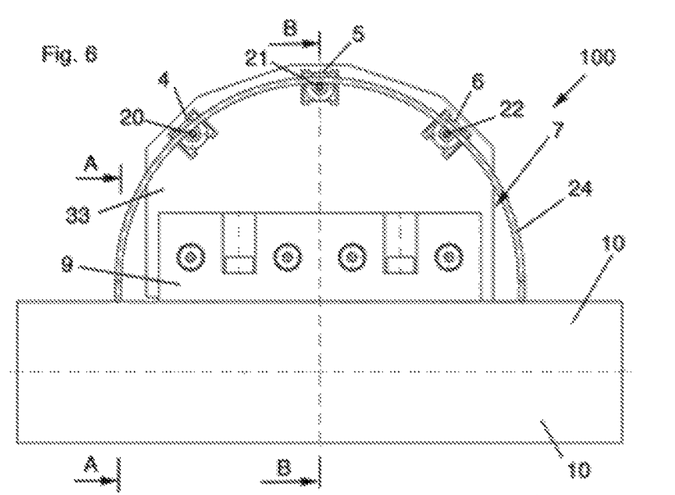
FIG. 6 is a side view of the Coriolis mass flow meter according to FIG. 2.

FIG. 6 shows a side view of the Coriolis mass flow meter 100, in which, behind the measurement tube 24 extending from the housing body 10, the add-on structure 7 with the circuit board 33 held by the fastening element 9 by screwing to the housing body 10 is visible. The coils 4, 5, 6 are each fastened on the circuit board 33 exactly in front of the measurement tube 24, in such a way that the permanent magnets 14, 15, 16 (not visible in FIG. 6), which are held in the magnet holders 20, 21, 16 on the measurement tube 24, dip straight into the windings of the coils 4, 5, 6.

Figure 6A:
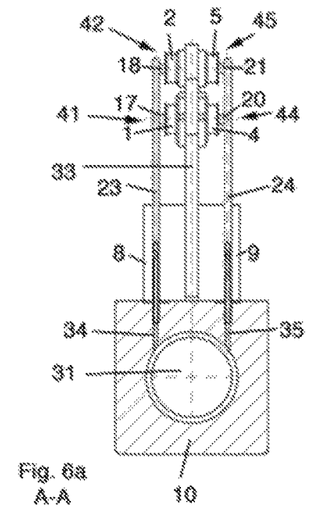
FIG. 6*a* shows a cross section through the Coriolis mass flow meter along section A-A according to FIG. 2.
Figure 6B:
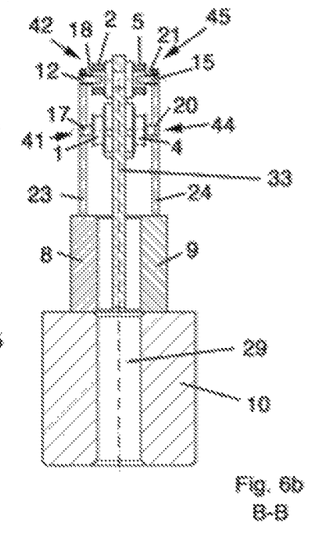
FIG. 6*b* shows a cross section through the Coriolis mass flow meter along section B-B according to FIG. 2.

This is also illustrated by the cross section according to FIG. 6a along the line AA as shown in FIG. 6, which shows the coils 1, 2 and 4, 5 respectively, which are spatially fixedly mounted on the circuit board 33 in front of the measurement tubes 23 and 24, respectively, with the associated magnet holders 17, 18 and 20, 21, respectively. The permanent magnets 11, 12, 14, 15 are dipped into the windings of the coils 1, 2, 4, 5 and are not visible. The cross section according to FIG. 6b along the line B-B according to FIG. 6 also shows, among other things, a section through the coils 2, 5 and the magnets 12, 15 of the vibration exciters 42, 45.

Figure 7:
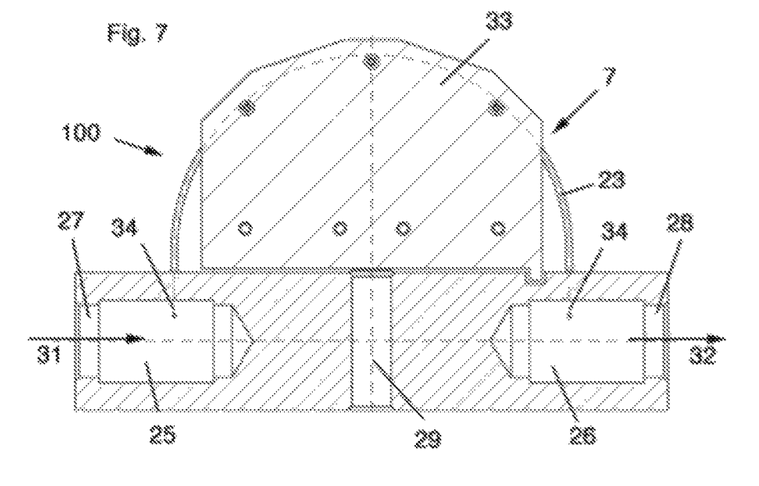
FIG. 7 shows a longitudinal section through the middle of the Coriolis mass flow meter according to FIG. 2.

FIG. 7 shows a longitudinal section through the middle of the Coriolis mass flow meter 100. From the longitudinal section in FIG. 7 and the section "A-A" in FIG. 6, it can be seen that the embodiment shown does not include separate flow dividers customary in Coriolis mass flow meters 100' according to the prior art (cf. FIG. 1-5', 6') at the flow inlet 31 and flow outlet 32, because the division of the flow of the fluid measurement medium at the flow inlet 31 into the two measurement tubes 23, 24 and the merging thereof at the flow outlet 32 takes place in the shown embodiment directly in the opening 25 of the flow inlet 31 and in the opening 26 of the flow outlet 32, thus in the solid housing body 10 through flow channels 34, 35, which lead from a side surface of the housing body 10 into the openings 25, 26 (cf. also FIG. 6a). However, the invention also includes other designs that differ from the design shown here in terms of flow dividers. In the illustrated embodiment, the meter 100 also has no preferred direction of flow, i.e. the flow inlet 31 and flow outlet 32 can also be interchanged. However, the invention also includes other designs in which the flow inlet 31 and flow outlet 32 can be different for the purpose of flow optimisation, and thus the flow direction is predetermined.

Furthermore, the embodiment shown in FIG. 7 has, on the inlet and outlet sides, threaded connections 27, 28 to which process connections can be screwed. However, the invention also includes other designs, e.g. without any process connections, i.e. with direct connection to the process line or with process connections which are welded or connected otherwise (by other connection techniques).

FIG. 7 also shows a possible embodiment for a cable passage 29 for passing cables from the inside of the Coriolis mass flow meter 100 to the outside, e.g. to measurement electronics, for power supply, for signal transmission in cases where the measurement electronics are located inside the device, e.g. are integrated on the circuit board 33. However, the invention also includes other designs in which cables are passed through at a different location and in a different direction.

Figure 8:
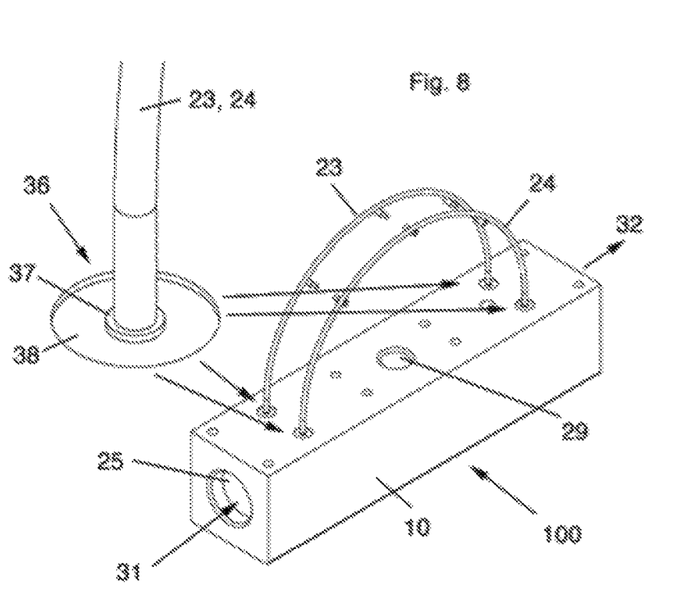
FIG. 8 shows in perspective the Coriolis mass flow meter according to FIG. 4 without vibration exciter, vibration sensor and add-on structure with a detailed illustration of how to fasten the measurement tubes.

FIG. 8 shows details of the connection of the measurement tubes 23, 24 to the solid housing body 10. In the embodiment shown, the measurement tubes 23, 24 are welded to the housing body 10 without additional material added from the outside. The additional material required to form a particularly durable welded connection, usually a welding wire, is provided in this embodiment by a part 36 of the housing body 10 by means of a special formation in this region (enlargement in FIG. 8). Specifically, a collar 37 is provided as the part 36, which is or has been milled into the solid housing body 10 (block of material) as the edge of a round channel 38 (in the form of a groove). The flow channel 34, 35 is formed in the middle of the annular collar 38. This annular collar 38 then forms the additional material which is integrated into the base body 10 and is used instead of the externally applied welding wire in order to form the weld seam between the measurement tube 23, 24 and the base body 10 formed by the solid block of material. However, the invention also includes other types of connection, e.g. by welding with additional material, by soldering, by gluing or by other connection techniques.

FIG. 9 shows in perspective a Coriolis mass flow meter 100 according to the embodiment of the present invention with a housing cover 30. It can be seen that the housing in the embodiment shown, apart from an intermediate seal (not shown), consists of only two parts screwed together, the housing body 10 with the components described above and the housing cover 30 covering and protecting the measurement region of the housing body 10. However, the invention also includes other designs in which, for example, the housing body 10 and the housing cover 30 are welded to each other or are otherwise connected to each other.

The housing body 10 is solid and in the embodiment shown here has the external appearance of a simple block. However, the invention also includes other embodiments in which the external appearance is not a block, e.g. in order to fasten the circuit board 33 (or other add-on structure 7) by means of a special shape of the housing body 10 directly (i.e. without the fastening elements 8, 9) to the housing body 10 or further special shapes, e.g. in order to fasten the Coriolis mass flow meter 100 to a stand or to a wall mount.

While a housing consisting of only two parts (apart from an intermediate seal) has various advantages, the invention also includes other designs which provide a housing consisting of more than two individual parts.

In a Coriolis mass flow meter 100 according to the present invention, in which the coils 1, 2, 3, 4, 5, 6 are no longer fastened to one of the measurement tubes 23, 24, but are spatially fixedly fastened to the housing body 10 (for example an add-on structure 7 or a circuit board 33 of the add-on structure 7), even in the case of a small or very small Coriolis mass flow meter 100, these coils do not have to be reduced to dimensions that are difficult to handle. In most cases, even commercial coils can be used. There is therefore no need for exotic positioning methods for coils and the fastening thereof to the measurement tubes, nor for any other exotic vibration exciter and vibration sensor principles. As a result, small and very small Coriolis mass flow meters 100 according to the present invention are more accurate, more reliable, and more economical to manufacture than those according to the prior art.

Coriolis mass flow meters 100 according to the present invention are, however, also more reliable than those according to the prior art for a further reason: because the electrically controllable coils 1, 2, 3, 4, 5, 6 (or general vibration exciters 42, 45 and vibration sensors 41, 43, 44, 46) are spatially fixed relative to the housing body 10, there are also no oscillating connecting wires from the coils 1, 2, 3, 4, 5, 6 or other electrically controllable electrical or electronic components to continuing lines, and if there are no oscillating connecting wires, then these will not break either. Connecting wires can also not be made arbitrarily thick, because even above a very low stiffness, connecting wires have a noticeable effect on the natural frequency of the measurement tube in question and lead to distortions in the measurement. The lack of such connecting wires, which is in accordance with the invention, thus also leads in itself to qualitatively better measurement results.

In a Coriolis mass flow meter 100 according to the present invention, the measurement tubes 23, 24 carry only the permanent magnets 11, 12, 13, 14, 15, 16 and their associated magnet holders 17, 18, 19, 20, 21, 22. In small and very small mass flow meters 100, this results in a very light "measurement tube-fluid-permanent magnet-magnet holder" system, as is immediately apparent, for example, from FIG. 4. This "measurement tube-fluid-permanent magnet-magnet holder" system also has hardly any local jumps in mass due to the lack of coils 1, 2, 3, 4, 5, 6 with the associated coil holders on the measurement tubes 23, 24, which local jumps in mass occur again and again due to the comparatively heavy coil technology in the prior art, even in larger meters. A Coriolis mass flow meter 100 according to the invention thus has simpler, more calculable inherent dynamics. Due to the lack of coils 1, 2, 3, 4, 5, 6 and coil holders on the measurement tubes 23, 24, the latter also experience far smaller oscillating aerodynamic forces (fan effect). Due to the absence of these disruptive effects, i.e. the difficult-to-control inherent dynamics and the higher aerodynamic damping, Coriolis mass flow meters 100 according to the present invention are more accurate overall than those according to the prior art.

Because the "measurement tube-fluid-magnet-magnet holder" system is much lighter and therefore has a much higher natural frequency than the heavier systems according to the prior art, Coriolis mass flow meters 100 according to the present invention operate at higher frequencies, e.g. according to the invention in the range of 200 Hz or at even higher frequencies than those according to the prior art. As a result, Coriolis mass flow meters 100 according to the present invention are not only more accurate, but also less sensitive to external influences such as, for example, vibrations, shock waves and the like, as those according to the prior art.

Coriolis mass flow meters 100 according to the present invention also have a completely new minimalist architecture for this type of meter. They have more coils 1, 2, 3, 4, 5, 6 and permanent magnets 11, 12, 13, 14, 15, 16 than those according to the prior art. However, components with critical dimensions and tolerances are reduced to a very small number. Thus, a housing (housing body 100 and housing cover 30) of only two parts (with the exception of a seal) can be used with a solid base body or housing body 10, which makes it possible to dispense with flow dividers and coupling elements for the measurement tubes 23, 24. The possibility of using a printed circuit board 33 instead of internal wiring, which is found in Coriolis mass flow meters according to the prior art, further reduces movable or vibratable components arranged on the base body 100. The fewer the parts or components used, the fewer the dimensional deviations and tolerances that can occur in the production of the individual parts and assembly of the devices. For this reason too, Coriolis mass flow meters 100 according to the present invention, in particular in the case of small and very small meters 100, are more accurate and more reliable than those according to the prior art.

In Coriolis mass flow meters 100 according to the present invention, both a one-sided phase measurement, i.e. on only one of the two measurement tubes 23, 24, and a phase measurement on both sides, i.e. on each of the two measurement tubes 23, 24, is possible. The number of coils 1, 2, 3, 4, 5, 6 used can vary accordingly. Thus, for example, in phase measurement on both sides, a total of six coils, i.e. two for the two vibration exciters 42, 45 and two times two for the four vibration sensors 41, 43, 44, 46, as shown in FIGS. 2 and 3, are necessary.

In one-sided phase measurement, in contrast, only four coils 1, 2, 3, 5 are necessary, i.e. two coils 2, 5 for the two vibration exciters 42, 45 and 2 for the two vibration sensors 41, 43. In this case (the one-sided phase measurement) two coils, e.g. coils 1, 3 or coils 4, 6 are either missing or present, but not switched or connected. In this case (the one-sided phase measurement) it also makes sense to replace the permanent magnets situated opposite the missing (or not switched) coils 1, 3 or 4, 6, i.e. permanent magnets 11, 13 or 14, 16, with non-magnetic bodies of the same shape and mass.

In Coriolis mass flow meters 100 according to the present invention, opposite coils 1, 4; 2, 5; 3, 6 can be electrically, depending on the desired type of vibration excitation and phase measurement, connected in parallel or in series. Coils connected in series can also be combined (in pairs) to form a (for example longer) coil. Opposite permanent magnets 11, 14; 12, 15; 13, 16 can (depending on the coil configuration and circuit) be installed so as to be either repelling (i.e. −/− or +/+) or attracting (+/− or −/+).

In order to shield the magnetic fields of opposite permanent magnets 11, 14; 12, 15; 13, 16, magnetically shielding foils and other magnetically shielding elements can also be used (e.g. in the case of strong permanent magnets).

LIST OF REFERENCE SIGNS 1 coil
2 coil
3 coil
4 coil
5 coil
6 coil
7 add-on structure
8 fastening element
9 fastening element
10 housing body
11 permanent magnet
12 permanent magnet
13 permanent magnet
14 permanent magnet
15 permanent magnet
16 permanent magnet
17 magnetic holder
18 magnetic holder
19 magnetic holder
20 magnetic holder
21 magnetic holder
22 magnetic holder
23 measurement
24 measurement tube
25 opening of the flow inlet 31
26 opening of the flow outlet 32
27 threaded connection
28 threaded connection
29 cable passage
30 housing cover
31 flow inlet
32 flow outlet
33 circuit board
34 flow channel to the measurement tube 23
35 flow channel to the measurement tube 24
36 additional material forming part of the housing
37 collar
38 round channel
41 vibration sensor
42 vibration exciter
43 vibration sensor
44 vibration sensor
45 vibration exciter
46 vibration sensor
100 Coriolis mass flow meter

The invention claimed is:

1. A coriolis mass flow meter, comprising:
a housing body, which has a flow inlet and a flow outlet for a fluid medium,
two measurement tubes, which are spaced apart from each other and are fastened to the housing body and connect the flow inlet and the flow outlet to each other,
at least one electrically controllable vibration exciter for each measurement tube, the vibration exciter being designed to cause the measurement tube to vibrate, and
at least two electrically controllable vibration sensors, the vibration sensors being designed to sense the vibration of at least one of the two measurement tubes,
wherein two vibration exciters and two or four vibration sensors are provided in the Coriolis mass flow meter wherein the vibration exciters and the vibration sensors are spatially fixedly fastened to the housing body between the two measurement tubes and wherein electromagnetic coils are used as vibration exciters and vibration sensors, wherein each coil interacts with a permanent magnet fastened to one of the measurement tubes, and wherein the measurement tubes are arranged in parallel and the permanent magnets are fastened to the measurement tubes opposite each other, wherein the permanent magnets are oriented in such a way that the permanent magnets attract each other, and
wherein the coils of the vibration exciters are connected in parallel and the coils of the vibration sensors are connected in series.

2. The coriolis mass flow meter according to claim 1, wherein an add-on structure is provided on the housing body, wherein the vibration exciters and vibration sensors are fastened to the add-on structure.

3. The coriolis mass flow meter according to claim 2, wherein the add-on structure has at least one circuit board on which the electrically controllable vibration exciters and vibration sensors are fastened and can be controlled via conductor tracks formed on the circuit board.

4. The coriolis mass flow meter according to claim 1, wherein at least two vibration sensors are assigned to one measurement tube.

5. The coriolis mass flow meter according to claim 1, wherein the vibration exciter is arranged on the measurement tube in the middle between the ends of the measurement tube, in that one of the vibration sensors is arranged on the measurement tube between the end of the measurement tube and the vibration exciter and the other of the vibration sensors is arranged on the same measurement tube between the other end of the measurement tube and the vibration exciter.

6. The coriolis mass flow meter according to claim 1, wherein the housing body of the Coriolis mass flow meter is designed as a solid block of material, in which an opening is made in each case as a flow inlet and as a flow outlet on opposite end faces, wherein in each case two flow channels lead from each opening to an exit in a side surface of the housing body and wherein the exit of one of the flow channels leads into one measurement tube and the exit of the other of the flow channels leads into the other measurement tube.

7. The coriolis mass flow meter according to claim 6, wherein in the solid housing body a cable passage is formed between the opening of the flow inlet and the opening of the flow outlet and extends from the side surface with the exits of the flow channels to the opposite side surface.

8. The coriolis mass flow meter according to claim 1, wherein the ends of the measurement tube are fastened to the housing body.

9. The coriolis mass flow meter according to claim 8, wherein the ends of the measurement tube are welded to the housing body, wherein additional material for forming a weld seam is provided on the housing body.

10. The coriolis mass flow meter according to claim 1, wherein the two measurement tubes are connected to each other by means of one or more cross struts or by means of one or more gusset plates or in that the Coriolis mass flow meter has no cross struts and/or gusset plates.

11. The coriolis mass flow meter according to claim 1, wherein the Coriolis mass flow meter is constructed in two parts including the housing body having the two measurement tubes, the at least one electrically controllable vibration exciter, and the at least two electrically controllable vibration sensors fastened thereto, and a housing cover.

12. A coriolis mass flow meter, comprising:
- a housing body, which has a flow inlet and a flow outlet for a fluid medium,
- two measurement tubes, which are spaced apart from each other and are fastened to the housing body and connect the flow inlet and the flow outlet to each other,
- at least one electrically controllable vibration exciter for each measurement tube, the vibration exciter being designed to cause the measurement tube to vibrate, and
- at least two electrically controllable vibration sensors, the vibration sensors being designed to sense the vibration of at least one of the two measurement tubes, wherein the vibration exciter and the vibration sensors are spatially fixedly fastened to the housing body between the two measurement tubes and wherein electromagnetic coils are used as vibration exciters and vibration sensors, wherein each coil interacts with a permanent magnet fastened to one of the measurement tubes, and wherein the measurement tubes are arranged in parallel and the permanent magnets are fastened to the measurement tubes opposite each other, wherein the permanent magnets are oriented in such a way that the permanent magnets attract each other,
- wherein an add-on structure is provided on the housing body, wherein the vibration exciters and vibration sensors are fastened to the add-on structure,
- wherein the add-on structure has at least one circuit board on which the electrically controllable vibration exciters and vibration sensors are fastened and can be controlled via conductor tracks formed on the circuit board,
- wherein the circuit board is spatially fixedly fastened to the housing body via at least two fastening elements of the add-on structure, each of the fastening elements having a higher mass than the circuit board and having both a common contact surface with the housing body and a common contact surface with the circuit board, and in that the circuit board is fastened to the two fastening elements.

13. The coriolis mass flow meter according to claim 12, wherein the circuit board is adjustably fastened to the two fastening elements.

14. The coriolis mass flow meter according to claim 12, wherein components of the measurement electronics are arranged on the circuit board.

\* \* \* \* \*